US009332397B2

(12) United States Patent
Madhavan et al.

(10) Patent No.: US 9,332,397 B2
(45) Date of Patent: May 3, 2016

(54) METHOD OF COMMUNICATING VOICE AND DATA TRANSMISSIONS FOR TELEMATICS APPLICATIONS

(75) Inventors: Sethu K. Madhavan, Canton, MI (US); Ki Hak Yi, Windsor (CA); David A. Adams, Troy, MI (US); Russell A. Patenaude, Macomb Township, MI (US); Kevin R. Krause, Plymouth, MI (US); Andrew J. MacDonald, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 1119 days.

(21) Appl. No.: 12/847,662

(22) Filed: Jul. 30, 2010

(65) Prior Publication Data

US 2012/0028617 A1 Feb. 2, 2012

(51) Int. Cl.
*H04W 24/00* (2009.01)
*H04W 4/04* (2009.01)
*H04W 4/14* (2009.01)

(52) U.S. Cl.
CPC ............... *H04W 4/04* (2013.01); *H04W 4/046* (2013.01); *H04W 4/14* (2013.01)

(58) Field of Classification Search
CPC .......... H04W 4/04; H04W 4/046; H04W 4/14
USPC ................ 455/404.1, 404.2, 414.1, 423, 434, 455/435.1, 435.2, 452.1, 452.2, 455; 370/324, 331, 346, 350, 449
See application file for complete search history.

(56) References Cited

U.S. PATENT DOCUMENTS

| | | | |
|---|---|---|---|
| 7,894,795 B1* | 2/2011 | Dunne et al. .................. | 455/406 |
| 2004/0180647 A1* | 9/2004 | Schwinke et al. ............ | 455/417 |
| 2004/0198366 A1* | 10/2004 | Crocker et al. ............ | 455/452.1 |
| 2006/0171368 A1* | 8/2006 | Moinzadeh et al. .......... | 370/346 |
| 2010/0227584 A1* | 9/2010 | Hong ......................... | 455/404.1 |
| 2011/0039587 A1* | 2/2011 | Madhavan et al. ............ | 455/466 |
| 2011/0250876 A1* | 10/2011 | Doherty et al. ............... | 455/419 |

* cited by examiner

*Primary Examiner* — Kent Chang
*Assistant Examiner* — Nelson Rosario
(74) *Attorney, Agent, or Firm* — Christopher DeVries; Reising Ethington P.C.

(57) ABSTRACT

A method of establishing an alternate communication channel between a telematics unit and a central facility that includes determining that a vehicle telematics unit is unable to communicate data over a voice call using a voice channel; initiating a data call from the vehicle telematics unit to a central facility based on that determination; sending information identifying the vehicle telematics unit to the central facility over the data call; establishing a voice call from the central facility to verbally communicate with the vehicle telematics unit based on the information identifying the vehicle telematics unit; and communicating data between the central facility and vehicle telematics unit via short messaging services (SMS) messages using the voice call from the central facility.

7 Claims, 2 Drawing Sheets

METHOD OF COMMUNICATING VOICE AND DATA TRANSMISSIONS FOR TELEMATICS APPLICATIONS

TECHNICAL FIELD

The present invention relates generally to vehicles and more particularly to communications between telematics devices and central facilities.

BACKGROUND OF THE INVENTION

Increasingly, vehicle manufacturers outfit their vehicles with a wide array of wireless communications capabilities. Telematics units installed in modern vehicles can wirelessly send both voice and data communications to a variety of recipients. Recipients can be central facilities, such as call centers, that include servers and/or live advisors capable of responding to the telematics unit. Vehicles equipped with telematics units have the ability to monitor and gather a diverse array of data about vehicle-related conditions and send it via the telematics unit. Telematics units can also facilitate voice communications between vehicles and central facilities or third parties. However, while communicating voice and data transmissions, it is possible that the communication pathway through which these transmissions flow may become unsuitable to satisfactorily transmit and/or receive the transmissions. As a result, it may be helpful to identify an alternate communication channel for the telematics unit to use during unsatisfactory conditions.

SUMMARY OF THE INVENTION

According to an aspect of the invention, there is provided a method of establishing an alternate communication channel between a telematics unit and a central facility. The steps include determining that a vehicle telematics unit is unable to communicate data over a voice call using a voice channel; initiating a data call from the vehicle telematics unit to a central facility based on that determination; sending information identifying the vehicle telematics unit to the central facility over the data call; establishing a voice call from the central facility to verbally communicate with the vehicle telematics unit based on the information identifying the vehicle telematics unit; and communicating data between the central facility and vehicle telematics unit via short messaging services (SMS) messages using the voice call from the central facility.

According to another aspect of the invention, there is provided a method of establishing an alternate communication channel between a telematics unit and a central facility. The steps include determining that a central facility is unable to send data to or receive data from a vehicle telematics unit over a voice call using a voice channel; receiving a voice call at the central facility placed from the vehicle telematics unit based on the determination; receiving Dual Tone Multiple Frequency (DTMF) cellular commands that communicate the identity of the vehicle telematics unit to the central facility over the voice call received; and communicating data between the central facility and vehicle telematics unit via short messaging services (SMS) messages using the voice call received.

According to yet another aspect of the invention, there is provided a method of establishing an alternate communication channel between a telematics unit and a central facility. The steps include: (a) determining that one or more vocoders in communication with a vehicle telematics unit and a central facility have begun operating a voice channel using a data rate lower than a threshold below which data cannot be transmitted; (b) instructing the vehicle telematics unit to place itself in an operational mode, based on step (a), in which it is capable of receiving voice calls from the central facility; (c) placing a data call from the vehicle telematics unit to the central facility using a vehicle modem that communicates the identity of the vehicle telematics unit via data packets; (d) accessing telematics subscriber information linked with the identity of the vehicle telematics unit at the central facility; (e) establishing a voice call, separate from the data call, to verbally communicate with the vehicle telematics unit using the received identity of the vehicle telematics unit accessed in step (d); and (f) communicating data between the central facility and the vehicle telematics unit via the packet data traffic channel of the voice call established in step (e).

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
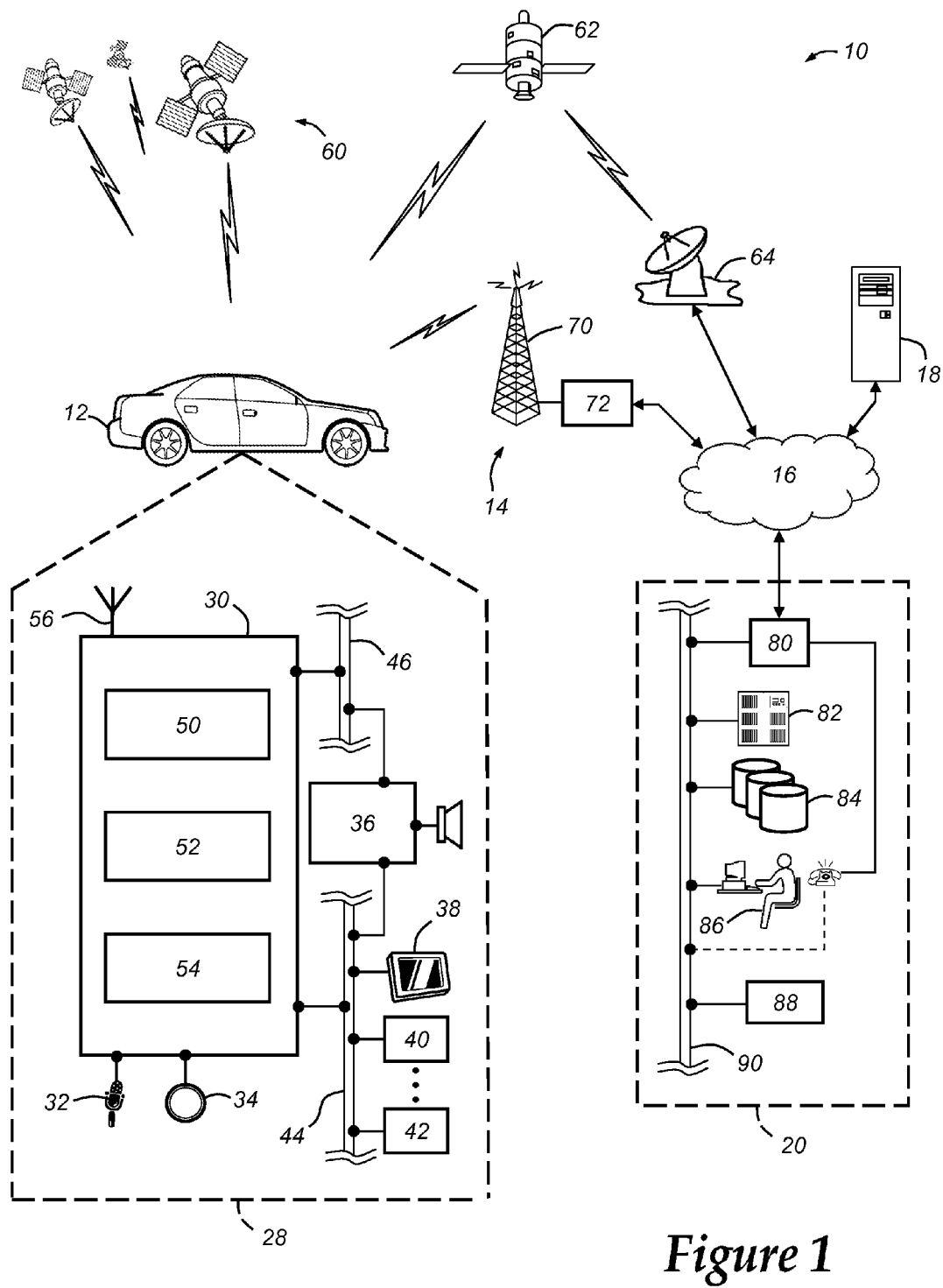
FIG. 1 is a block diagram depicting an exemplary embodiment of a communications system that is capable of using the method disclosed herein.

The method described below facilitates an alternative way to send voice and/or data communications between a wireless device, such as a vehicle telematics unit, and a central facility, such as a call center, when the standard way those communications are transmitted no longer adequately functions. This can happen when voice and data communications are normally transmitted and received over a cellular call. More specifically, this can apply to voice and data communications transmitted over the voice channel of digital cellular calls that are capable of communicating both voice and data transmissions between parties. If the digital transmissions over the voice channel are sent at a data rate below which data communications can be sent—even though voice communications are possible—data may not be communicated. In those situations, it can be helpful to send voice communications over the voice channel of the cellular call, but communicate data in an alternative way. This way will be described in more detail below.

The data rates at which the voice channel of a cellular call communicates can be set by vocoders; one at the wireless device and one at the central facility. To communicate voices and data over the voice channel of the cellular call, each party can use a vocoder at each end of the call. Vocoders can carry out multiple tasks. For instance, each vocoder can act as an audio to digital (A/D) signal converter (and vice versa) transforming audible voices into a digital signal, which can be transmitted using known technologies to another party where the vocoder converts the digital signal to an audio signal. The vocoders also can serve to compress the information transmitted over that digital signal and, correspondingly, decompress the information received. This can involve known packet data techniques. Given that the cellular call can be digital, the vocoder can assist in sending voices (functioning as an A/D converter) and data (without converting the data to digital) and compress both for transmission over the voice channel. Both vocoders transmit/receive the compressed signal at a sampling rate or data rate that is mutually-agreed upon by each vocoder. This mutually-agreed upon rate can vary over time and depend on factors, such as the quality of wireless connection between two parties (e.g. signal strength at either end). When that mutually-agreed upon rate falls below a predetermined value, it may not greatly affect voice communications (e.g. voice conversations are still able to be carried on) but data transmissions may no longer be possible.

If the data rate has fallen below a level where data can be sent via the voice channel it is possible to detect it. The wireless device, such as the vehicle telematics unit, can then be directed to contact a central facility, such as a call center, via a cellular call and transmit information that identifies the device to the facility. This can be done in several ways. For instance, the wireless device can place a cellular call to the central facility and use a traffic channel of the cellular call to communicate data with the facility. In another example, the wireless device can place a cellular call to the central facility and send data via DTMF cellular commands over a control channel or via the voice channel. In all examples, the central facility is able to communicate verbally with the wireless device via the voice channel, while data can be sent using a pathway other than the voice channel, such as Short Message Service, or via the voice channel via DTMF tones. These techniques will be described in more detail below.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a cellular call (a voice channel and/or a data channel) with wireless carrier system 14 so that voice and/or data transmissions can be sent and received over the call. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a vocoder, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. The call center 20 is given as one example of a central facility and it should be appreciated that other implementations are possible. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
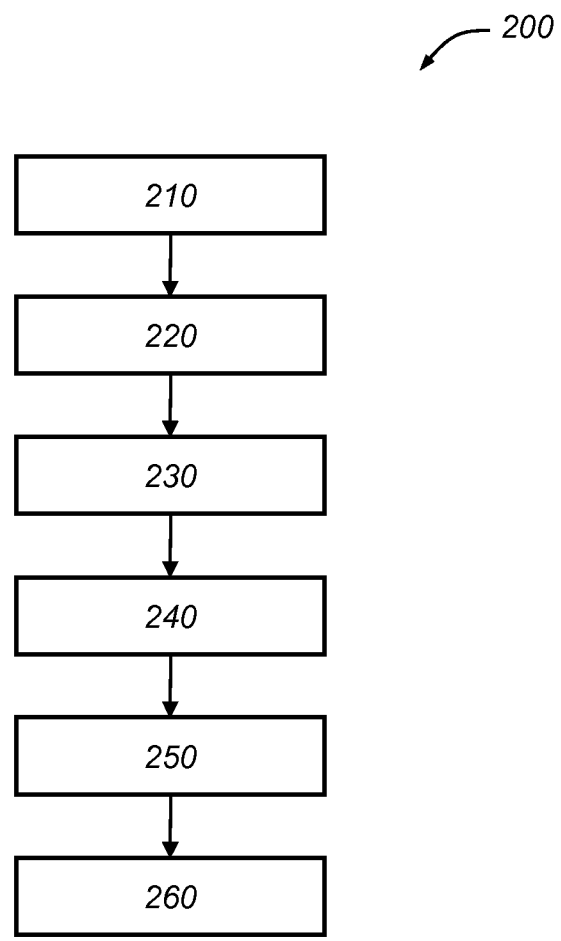
FIG. 2 is a flow chart of a method of establishing an alternate communication channel.

Turning now to FIG. 2, there is an exemplary method 200 of establishing an alternate communication channel between a wireless device and a central facility. The method 200 begins at step 210 with determining that the vehicle telematics unit 30 is unable to communicate data over a voice call using a voice channel. This can mean that data normally transmitted via the voice channel of a cellular call cannot be so transmitted because the data rate at which the voice channel of the cellular call is sent is too low. The term "voice call" will be used herein and can generally refer to a cellular call capable of using a voice channel over which voice and/or data is sent. In one example, the vehicle telematics unit 30 detects that the data rate of the voice channel is too low. That means that the vehicle telematics unit 30 can receive an indication from the vocoder that the data rate has fallen below a predetermined rate. In another example, the vehicle telematics unit 30 can make a predetermined number of unsuccessful attempts to transmit data to a central facility, such as the call center 20, and based on those attempts decide that the data rate of the voice channel between the vehicle telematics unit 30 and the call center 20 is too low. The method 200 proceeds to step 220.

At step 220, the vehicle telematics unit is instructed to place itself in an operational mode based on the determination that the vehicle telematics unit is unable to communicate data in step 210. Wireless devices like the vehicle telematics unit 30 are not always configured to receive cellular calls. This may be purposefully done in order to not use and/or be charged for voice calling features available in the vehicle 12. In those cases, the vehicle telematics unit 30 can be viewed by a cellular provider as a "prepaid" device which is unable to place calls without first establishing an account with a cellular provider. However, there are times when this limitation can be overridden and it can be beneficial to allow the vehicle telematics unit 30 to place and receive a limited number of calls. Examples of this can include emergency situations, such as natural disaster, vehicle theft, medical crises within the vehicle, or generally any situation during which a public service access point (PSAP) may be involved.

To place itself in the aforementioned operational mode, the vehicle telematics unit 30 can take one of a number of actions, such as placing itself in a "postpaid" state for a predetermined amount of time (e.g. 1 hour). This means that the wireless carrier system 14 can recognize the vehicle telematics unit 30 as a wireless device capable of placing and/or receiving calls even though it is not associated with an account serviced by a cellular provider. In another example, placing the vehicle telematics unit 30 in an operational mode can include an instruction to place calls using a voice fall back (VFB) number. VFB numbers are numbers that are accepted by the wireless carrier system 14 without regard to the payment/account status of the wireless device/vehicle telematics unit 30. One example of this is the number "911." It can be dialed by any cellular phone regardless if that phone is set up to make other voice calls. The method 200 proceeds to step 230.

At step 230, information identifying the vehicle is transmitted from the vehicle telematics unit to the central facility. In one embodiment, step 230 involves initiating or placing a data call from the vehicle telematics unit 30 to the call center 20. Data call can mean placing a cellular call over the wireless carrier system 14 and sending data using the data channel of that call. In contrast to using the voice channel, which as noted previously may not communicate using a sufficient data rate to send data, the data channel (e.g. a dedicated data channel communicating only data) should be able to sufficiently receive data from the vehicle telematics unit 30 at the call center 20. The data can include information identifying the vehicle telematics unit 30 to the call center 20 and can be placed using a network access device, such as the wireless modem, located on the vehicle 12. The information identifying the vehicle telematics unit 30 (or vehicle 12) can include a vehicle identification number (VIN), a station identification number (STID), electronic serial number (ESN), or other such identifying code. This identifying information can be used to determine the identity of the vehicle 12 or vehicle telematics unit 30 that is placing the data call.

In another embodiment, step 230 involves placing a voice call from the vehicle telematics unit 30 to the call center 20 and communicating DTMF cellular commands over this voice call. Traditionally, DTMF tones were audible tones created by combining two frequencies, one low and one high. Various combinations of these frequencies each indicated a command, such as the key on a telephone pressed by a user. A combination of frequencies can be called a DTMF tone and transmitted as an analog signal over a telephone system (e.g. POTS). For example, the DTMF tone created by pressing the pound (#) key on a traditional (e.g. analog) phone system would be the combination of 941 Hz (low) and 1477 Hz (high) signals. Cellular systems 14 may still use these DTMF tones but can do so in multiple ways. In one example, DTMF cellular commands can be inputted as traditional (audible) DTMF tones (an analog signal) to a vocoder (or other A/D converter) and sent over the voice channel where they are reproduced using a vocoder (or other D/A converter) at the call center 20. So, in this case digital cellular telephone systems can allow DTMF cellular commands to be sent that correspond to the traditional DTMF tones used with a POTS system. In another example, the DTMF cellular commands can be transmitted via the control channel or traffic channel of a voice call over a cellular system 14. That is, rather than sending traditional audible DTMF cellular commands over the voice channel, it is also possible to send these commands via a control or traffic channel of the voice call. In either case, the DTMF cellular commands likely would not encounter the unsatisfactory data rate used by the vocoders discussed above. The DTMF cellular commands can be sent from the vehicle telematics unit 30 to the call center 20 and include information identifying the vehicle telematics unit 30 to the call center 20 as discussed above. The method 200 proceeds to step 240.

At step 240, telematics subscriber information is accessed based on the information identifying the vehicle transmitted in step 230. Upon receiving the identifying information from the vehicle telematics unit 30 at step 230, the call center 20 can access subscriber information, which can include a telephone number associated with the unit 30 that the call center 20 can call. The telematics subscriber information can be maintained within databases 84 at the call center 20. The method 200 proceeds to step 250.

At step 250, a voice call is established to verbally communicate with the vehicle telematics unit using the telematics subscriber information. The call center 20 can place a cellular call over the wireless carrier system 14 to the vehicle telematics unit 30 and speak to vehicle occupants via the voice channel. This can be done using the phone number accessed at step 240. It may be beneficial for the call center 20 to verbally communicate with the occupants of the vehicle 12 over the voice channel of this voice call for various reasons. For example, during step 210 the vehicle telematics unit 30 may have been unable to communicate data over a voice call using a voice channel due to some type of emergency and advisors 86 at the call center 20 can assist vehicle occupants during an emergency by providing a host of services to them. In another example, it is possible that verbal communication with the vehicle occupants can help explain any anomalies in vehicle operation that they may perceive. The method proceeds to step 260.

At step 260, data is communicated between the central facility and the vehicle telematics unit via voice call established in step 250. Once the voice call is established, it can be used to transmit data between the call center 20 and the vehicle telematics unit 30 in an alternate way. That is, rather than sending data via the voice channel of a voice call, the call center 20 and the vehicle telematics unit 30 can use Short Message Service (SMS) messages, Unstructured Supplementary Service Data (USSD), or other such mechanism, which may depend on the type of cellular system used. These messages can be sent and received between the call center 20 and the vehicle telematics unit 30 over the voice call but can be sent via a control channel or a traffic channel, such as the packet data traffic channel. Using SMS, USSD, or other messaging protocol, the call center 20 can use data requests to query the vehicle 12 through the vehicle telematics unit 30 and receive responses in the form of data from the unit 30. While this occurs, the call center 20 and/or the telematics unit 30 can periodically check to determine whether the data rate used by the vocoder (or the data rate between the call center 20 and the telematics unit 30) has risen to a level sufficient to restart voice and data communications via the voice channel of the voice call. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing an alternate communication channel between a telematics unit and a central facility, comprising the steps of:
   (a) determining that a central facility is unable to send data to or receive data from a vehicle telematics unit over a voice call using a voice channel;
   (b) sending an instruction from the central facility to the vehicle telematics unit alerting the vehicle telematics unit that the voice channel of the voice call is operating at a data rate below a predetermined threshold;
   (c) receiving a voice call at the central facility placed from the vehicle telematics unit based on the determination of step (a);
   (d) receiving Dual Tone Multiple Frequency (DTMF) cellular commands that communicate the identity of the vehicle telematics unit to the central facility over the voice call received in step (c); and
   (e) communicating data between the central facility and vehicle telematics unit via short messaging services (SMS) messages using the voice call received in step (c).

2. The method of claim 1, further comprising the step of receiving a message from a vocoder at the central facility alerting the central facility that the voice channel is operating at a data rate below a predetermined threshold.

3. The method of claim 1, further comprising the step of commanding the vehicle telematics unit to change its operating mode from "prepaid" to "postpaid".

4. The method of claim 1, further comprising the step of commanding the vehicle telematics unit into an operating mode that calls a voice fall back (VFB) number, which communicates with the central facility.

5. The method of claim 1, wherein the identity of the vehicle telematics unit in step (d) further comprises one or more of a vehicle identification number (VIN), a station identification number (STID), or an electronic serial number (ESN).

6. The method of claim 1, wherein step (d) further comprises receiving one or more DTMF cellular commands as audible tones between the central facility and the vehicle telematics unit over the voice channel of the voice call.

7. The method of claim 1, wherein step (d) further comprises communicating one or more DTMF cellular commands between the central facility and the vehicle telematics unit via the control channel or the traffic channel of the voice call.

\* \* \* \* \*